(12) United States Patent
Bauer

(10) Patent No.: US 9,073,420 B2
(45) Date of Patent: Jul. 7, 2015

(54) FRAME ARRANGEMENT OF A MOTOR VEHICLE BODY

(71) Applicant: Dr. Ing. h.c. F. Porsche Aktiengesellschaft, Stuttgart (DE)

(72) Inventor: Markus Alexander Bauer, Heusenstamm (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/506,845

(22) Filed: Oct. 6, 2014

(65) Prior Publication Data

US 2015/0102634 A1   Apr. 16, 2015

(30) Foreign Application Priority Data

Oct. 16, 2013  (DE) .......................... 10 2013 111 412

(51) Int. Cl.
   *B60J 7/22*   (2006.01)
(52) U.S. Cl.
   CPC ........................ *B60J 7/223* (2013.01)
(58) Field of Classification Search
   CPC ..................... B60J 7/22; B60J 7/223
   USPC ..................... 296/180.1, 180.5, 217
   See application file for complete search history.

(56) References Cited

U.S. PATENT DOCUMENTS

| | | | |
|---|---|---|---|
| 2,827,328 A * | 3/1958 | O'Kane et al. ............... | 454/150 |
| 3,695,674 A | 10/1972 | Baker | |
| 6,086,146 A | 7/2000 | Nabuurs | |
| 6,273,501 B1 * | 8/2001 | Raasakka et al. .............. | 296/217 |
| 6,286,899 B1 * | 9/2001 | Hirschvogel et al. ......... | 296/217 |
| 6,416,120 B1 * | 7/2002 | Schutt ............................ | 296/217 |
| 6,910,733 B2 | 6/2005 | Raasakka | |
| 8,919,862 B2 * | 12/2014 | Inoue et al. ................ | 296/180.1 |
| 2006/0103166 A1 * | 5/2006 | Queveau et al. ........... | 296/180.1 |
| 2014/0084626 A1 * | 3/2014 | Hori ........................... | 296/180.5 |

FOREIGN PATENT DOCUMENTS

| | | |
|---|---|---|
| DE | 3833046 | 4/1990 |
| DE | 102008058160 | 5/2010 |
| FR | 1029388 | 6/1953 |
| FR | 1118420 | 6/1956 |
| FR | 2940934 | 7/2010 |

OTHER PUBLICATIONS

British Appl. No. 1417760.4—Combined Search and Examination Report issued Apr. 7, 2015.

* cited by examiner

*Primary Examiner* — Jason S Morrow
(74) *Attorney, Agent, or Firm* — Gerald E. Hespos; Michael J. Porco; Matthew T. Hespos

(57) ABSTRACT

A frame arrangement of a motor vehicle body accommodates at least a windshield and has a cowl frame part that runs in a transverse direction of the motor vehicle on an upper side of the windshield. At least one pivotably mounted wind deflector is mounted at the cowl frame part and is movable by a drive device. The wind deflector has at least first and second flow surfaces. The flow surfaces are arranged so that, via a pivoting movement of the wind deflector, only one flow surface can be set into an active position. The first flow surface is designed to match the cowl frame part and the second flow surface has at least one interfering contour.

10 Claims, 2 Drawing Sheets

FRAME ARRANGEMENT OF A MOTOR VEHICLE BODY

CROSS-REFERENCE TO RELATED APPLICATION

This application claims priority on German Patent Application No. 10 2013 111 412.1, filed Oct. 16, 2013, the entire disclosure of which is incorporated herein by reference.

BACKGROUND

1. Field of the Invention

The invention relates to a frame arrangement of a motor vehicle body. The frame arrangement accommodates at least a windshield. A cowl frame part runs in the transverse direction of the motor vehicle on an upper side of the windshield and has at least one pivotably mounted wind deflector member that is movable by a drive device and has at least two flow surfaces.

2. Description of the Related Art

DE 38 33 046 A1 describes a wind deflector member that can be pivoted out of a frame part so that an airflow can be guided between two opposite flow surfaces without turbulence on the frame part. This feature is advantageous in motor vehicles that have a convertible top. However, this frame arrangement has the disadvantage of being very complicated and therefore expensive to produce because the flow surfaces must be aligned exactly with one another. Additionally, an embodiment of this type is susceptible to small displacements of the flow surfaces with respect to one another. Thus, turbulence and the disadvantageous noises associated therewith are produced as a result.

It is therefore an object of the invention to provide a frame arrangement with a wind deflector member that is of substantially simpler construction and reliably prevents air turbulence during driving.

SUMMARY OF THE INVENTION

The invention relates to a frame arrangement with a wind deflector having flow surfaces arranged so that, via a pivoting movement, only one flow surface can be set into an active position. A first flow surface is designed to match the cowl frame part and a second flow surface has at least one interfering contour. A frame arrangement of this type is simple and therefore cost-effective to produce. Since only one flow surface is in the active position, a frame arrangement of this type is less susceptible to vibration, impacts, etc., that may have a disadvantageous effect on the flow capability. It is also possible in a simple manner to provide more than two flow surfaces that can be set depending on certain basic conditions, such as speed and wind strength, to prevent disadvantageous noises, such as booming in the open driving mode of a convertible.

The interfering contour of the second flow surface may be designed in a cam-shaped manner, angled in the direction of travel. Unpleasant noises, such as booming, can be avoided sustainably by such a design of the interfering contour.

With regard to a simple drive device assigned to the wind deflector member, the flow surfaces may be offset to one another by 180°.

At least two wind deflector members may be provided. Thus, it is possible to use the wind deflector members on those surfaces of the frame arrangement that are particularly susceptible to air turbulence. Each wind deflector member may be assigned a drive device, and the different wind deflector members may be activated differently. This design affords the advantage of creating small, compact units that can be inserted into the frame arrangement in a particularly simple manner.

A channel element for removing water may be provided. A surface of the frame part that faces away from the windshield advantageously can be designed as a contact surface for a convertible top element.

The invention is explained in more detail below with reference to the drawings.

DETAILED DESCRIPTION

Figure 1:
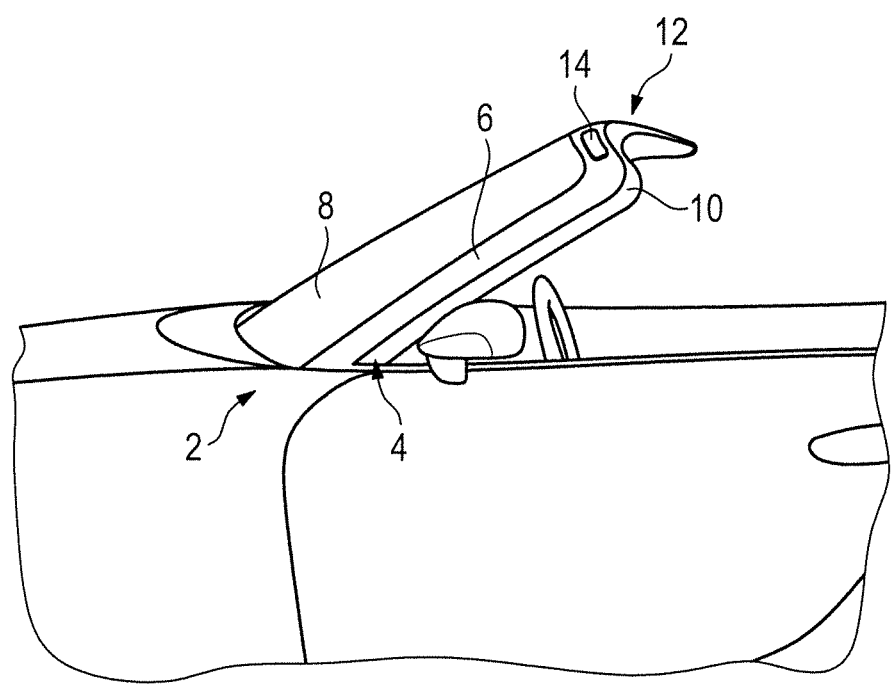
FIG. 1 is a side view of a vehicle with a frame arrangement according to the invention.

FIG. 1 is a side view of a motor vehicle 2 having a body 4. The body 4 has a frame arrangement 6 to which a windshield 8 is fastened in a known manner. The frame arrangement 6 has a frame part 10 that runs in the transverse direction on an upper side of the windshield 8. In the present case, the frame part 10 is a cowl frame part. A first wind deflector 12 has a second flow surface 14 in an active position.

Figure 2:
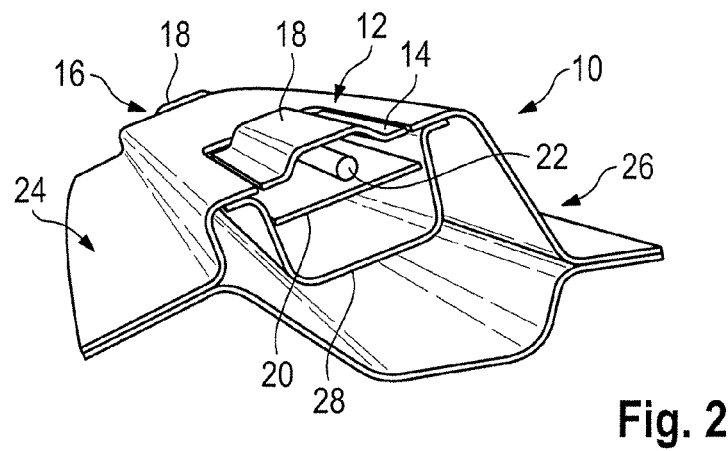
FIG. 2 is a perspective sectional view of a frame part of the frame arrangement of FIG. 1 with a first position of wind deflector members.

FIG. 2 is a perspective sectional view of the cowl frame part 10 of FIG. 1. Two wind deflectors 12, 16 are arranged in the cowl frame part 10 and are shown in the active position. Each wind deflector 12, 16 has a second flow surface 14 and a first flow surface 20. The second flow surface 14 has an upwardly convex trapezoidal cam-shaped interfering contour 18 that will project up beyond the cowl frame part 10. Front and rear edge regions of the second flow surface 18 are configured to merge smoothly into the adjacent regions of the cowl frame part 10. The first flow surface 20 has a contour matched to the cowl frame part 10, but is offset by 180° to the second flow surface 14. Accordingly, FIG. 2 shows the first flow surface 20 in the pivoted-in state and not subjected to a flow. The first and second deflectors 12, 16 and hence the flow surfaces 14, 20 thereof are mounted on a drive shaft 22. The drive shaft 22 is connected to a drive device (not illustrated specifically) in a known manner.

A surface 24 of the cowl frame part 10 that is directed toward the windshield 8 is of step-shaped design and therefore already serves for preventing air turbulence, and the noises associated therewith during the open driving of a convertible. Consequently, the wind deflector members 12, 16 only are used under certain boundary conditions, such as depending on driving speed and wind strength. A surface 26 of the cowl frame part 10 that faces away from the windshield 8 also functions as a contact surface for a convertible top (not illustrated specifically).

An upwardly concave channel 28 is provided below the wind deflectors 12, 16 for removing water penetrating, for example, during a pivoting movement. The water is removed by the channel 28 via an A pillar of the motor vehicle body 4.

Figure 3:
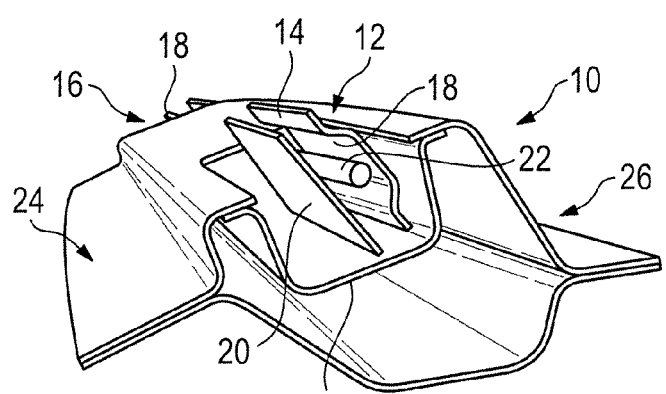
FIG. 3 is a perspective sectional view of a frame part of the frame arrangement of FIG. 1 with a second position of wind deflector members.
Figure 4:
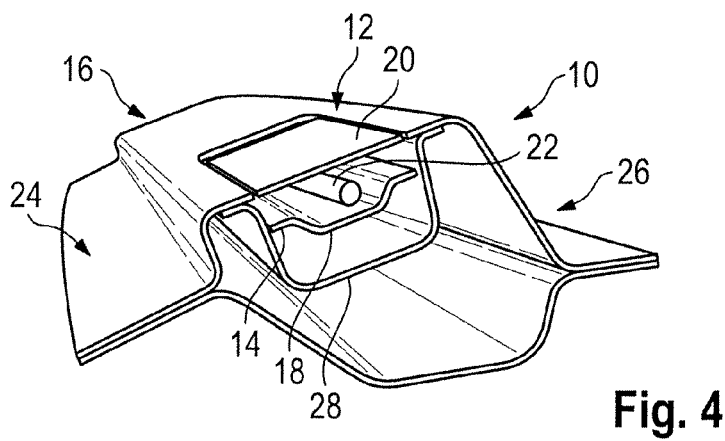
FIG. 4 is a perspective sectional view of a frame part of the frame arrangement from FIG. 1 with a third position of wind deflector members.

FIG. 3 shows the cowl frame part 10 of FIG. 2 while the wind deflectors 12, 16 are being pivoted from the orientation of FIG. 2 to the orientation of FIG. 4 where the first flow surface 20 is in an active position. The first flow surface 20 and the second flow surface 14 can be painted in the color of the vehicle, and therefore, when the first flow surface 20 is in the active position, a smooth visible surface of the cowl frame part 10 is produced.

What is claimed is:

1. A frame arrangement of a motor vehicle body, the frame arrangement comprising: a windshield, a cowl frame part that runs in a transverse direction of the motor vehicle on an upper side of the windshield, the cowl frame having an upper surface with at least one opening and at least one wind deflector pivotably mounted in the opening and movable by a drive device, the at least one wind deflector having first and second opposite flow surfaces, the first flow surface being configured to match the cowl frame part and the second flow surface having at least one interfering contour, the at least one wind deflector being pivotable between a first position where the first flow surface faces outward from the opening and the second flow surface faces an interior of the cowl frame and a second position where the second flow surface faces outward from the opening and the first flow surface faces the interior of the cowl frame.

2. The frame arrangement of claim 1, wherein the interfering contour of the second flow surface has a cam-shape angled in a direction of travel.

3. The frame arrangement of claim 1, wherein the flow surfaces are offset by 180° from each other to face in substantially opposite directions.

4. The frame arrangement of claim 1, wherein the at least one wind deflector comprises at least two of the wind deflectors.

5. The frame arrangement of claim 4, wherein each of the wind deflectors has a drive device.

6. The frame arrangement of claim 1, further comprising a channel for removing water.

7. The frame arrangement of claim 1, wherein the cowl frame part has a contact surface facing away from the windshield and being engageable by a convertible top element.

8. A frame arrangement of a motor vehicle body, the frame arrangement comprising: a windshield, a cowl frame part that runs in a transverse direction of the motor vehicle on an upper side of the windshield, laterally spaced left and right openings in the cowl frame part, and left and right pivotably mounted wind deflectors mounted in the respective left and right openings of the cowl frame part, each of the wind deflectors being pivotable about an axis extending substantially in the transverse direction of the motor vehicle, each of the wind deflectors having first and second flow surfaces facing in opposite directions the first flow surface being configured to match a shape of the cowl frame part and the second flow surface having at least one interfering contour configured to project up beyond the cowl frame part, each of the wind deflectors being pivotable between a first position where the first flow surface faces outward from the opening and the second flow surface faces an interior of the cowl frame and a second position where the second flow surface faces outward from the opening and the first flow surface faces the interior of the cowl frame.

9. A frame arrangement of a motor vehicle body, the frame arrangement comprising: a windshield, a cowl frame part that runs in a transverse direction of the motor vehicle on an upper side of the windshield, and at least one pivotably mounted wind deflector that is movable by a drive device, each of the wind deflectors having first and second flow surfaces arranged so that, via a pivoting movement, only one of the flow surfaces can be set into an active position, wherein the first flow surface is configured to match the cowl frame part and the second flow surface has at least one interfering contour, wherein the second flow surface of each of the wind deflectors has a convex trapezoidal shape.

10. The frame arrangement of claim 8, wherein front and rear edge regions of the second flow surface of each of the wind deflectors are configured to merge with regions of the cowl frame part forward and reward of the respective opening in the cowl frame part.

* * * * *